US011060579B2

(12) United States Patent
Downey et al.

(10) Patent No.: US 11,060,579 B2
(45) Date of Patent: *Jul. 13, 2021

(54) ENERGY TRANSMISSION CONTROL MOUNT

(71) Applicant: Paul C. Downey, Toronto (CA)

(72) Inventors: Paul C. Downey, Toronto (CA); William T. Wilkinson, Toronto (CA)

(73) Assignee: Paul C. Downey, Vaughan (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/673,544

(22) Filed: Aug. 10, 2017

(65) Prior Publication Data

US 2018/0180127 A1 Jun. 28, 2018

Related U.S. Application Data

(63) Continuation of application No. 14/839,124, filed on Aug. 28, 2015, now abandoned, which is a
(Continued)

(51) Int. Cl.
| E04B 1/98 | (2006.01) |
| F16F 1/376 | (2006.01) |
| F16F 15/00 | (2006.01) |
| E04F 13/08 | (2006.01) |
| E04B 1/82 | (2006.01) |

(Continued)

(52) U.S. Cl.
CPC ............. *F16F 1/376* (2013.01); *E04B 1/82* (2013.01); *E04B 1/98* (2013.01); *E04F 13/0805* (2013.01);
(Continued)

(58) Field of Classification Search
USPC ........ 248/610, 611, 613, 562, 636; 267/136, 267/140, 141.3, 141.1, 141.4; 52/704,
(Continued)

(56) References Cited

U.S. PATENT DOCUMENTS

| 1,350,349 A | 8/1920 | Walther |
| 4,067,531 A * | 1/1978 | Sikula ............... F16B 5/0258 220/378 |

(Continued)

FOREIGN PATENT DOCUMENTS

| GB | 2332004 | 6/1999 |
| GB | 2420130 | 5/2006 |
| WO | 2005031080 | 4/2005 |

OTHER PUBLICATIONS

European Search Report dated Sep. 25, 2015 for corresponding EP application No. EP07784954.
(Continued)

*Primary Examiner* — Alfred J Wujciak
(74) *Attorney, Agent, or Firm* — Tarolli, Sundheim, Covell & Tummino LLP

(57) ABSTRACT

An energy transmission control mount comprises a carrier having a first major surface, an opposite second major surface and an aperture provided therein. Channels are provided adjacent opposite ends of the first surface. Vibration dampening material is provided on the carrier. The vibration dampening material substantially lines the channels and the aperture and extends over at least a portion of the second surface.

21 Claims, 2 Drawing Sheets

Related U.S. Application Data continuation of application No. 13/033,959, filed on Feb. 24, 2011, now Pat. No. 9,121,469, which is a continuation of application No. 11/489,187, filed on Jul. 19, 2006, now Pat. No. 7,895,803.

(51) Int. Cl.
*F16F 1/373* (2006.01)
*F16F 15/08* (2006.01)

(52) U.S. Cl.
CPC .............. *F16F 1/373* (2013.01); *F16F 15/00* (2013.01); *F16F 15/08* (2013.01); *E04B 2001/8272* (2013.01); *E04B 2001/8281* (2013.01)

(58) Field of Classification Search
USPC ............ 52/707, 710, 511, 235, 481.1, 482.1, 52/483.1, 167.1, 167.8; 403/223, 224, 403/225, 226, 227, 228
See application file for complete search history.

(56) References Cited

U.S. PATENT DOCUMENTS

| | | |
|---|---|---|
| 4,110,948 A | 9/1978 | Maier, Jr. |
| 6,267,347 B1 | 7/2001 | Ryan et al. |
| 6,367,217 B1 | 4/2002 | Niese et al. |
| 7,093,614 B2 | 8/2006 | Kordon |
| 7,895,803 B2 * | 3/2011 | Downey .................. E04B 1/82 52/511 |
| 8,240,430 B2 * | 8/2012 | Downey .................. B32B 3/30 181/290 |
| 2004/0245427 A1 | 12/2004 | Meisel et al. |

OTHER PUBLICATIONS

Kinetics Noise Control, "Resilient Sound Isolation Wall and Ceiling Clip" www.kineticsnoise.com/replocation.asp.
Akustik + Slomer: Models and Dimensions, www.akustik.com.

* cited by examiner

ENERGY TRANSMISSION CONTROL MOUNT

FIELD OF THE INVENTION

The present invention relates generally to energy transmission control and in particular, to an energy transmission control mount designed to reduce transmission of energy such as vibration and sound between components such as for example, building structures.

BACKGROUND OF THE INVENTION

Insulating building structures to inhibit the transmission of vibration and sound from one region to another is common in many environments. For example, vibration dampening pads for use on floors to inhibit vibration from traveling through floor surfaces are well known. Until recently, very little was done however to attempt to inhibit vibration and sound from travelling through walls.

U.S. Pat. No. 6,267,347 to Ryan et al. discloses an acoustic mount for isolating wall structures. The acoustic mount comprises a mounting clip, a sound absorbing inset and a bush. The mounting clip has an orifice defining a single start thread for engaging the thread on the outer surface of a stub on the sound absorbing insert. The sound absorbing insert has an insert for receiving the bush. The sounding absorbing insert is formed of soft rubber and has dimples thereon. The bush when received by the sound absorbing insert is isolated from the mounting clip.

In use, the mounting clip is placed either directly or indirectly in contact with a thin wall or plaster board, while the bush is placed indirectly in contact with a block wall. The sound absorbing insert, which isolates the bush from the mounting clip, dampens the transmission of low frequency noise between the block wall and the thin wall or plaster board.

Another mount to isolate walls and ceilings is manufactured by Kinetics Noise Control Inc. of Dublin, Ohio and is sold under the name IsoMax. The IsoMax mount is in the form of a resilient sound isolation clip designed to attach to ceiling joists, wall studs or masonry. Layers of gypsum or plaster board are hung onto furring channels defined by the isolation clip.

Although the above mounts help to inhibit the transmission of vibration and sound between structures, they are costly to manufacture, complex and expensive to consumers. It is therefore an object of the present invention to provide a novel energy transmission control mount.

SUMMARY OF THE INVENTION

Accordingly, in one aspect there is provided an energy transmission control mount comprising:

a carrier having a first major surface, an opposite second major surface and an aperture provided therein;

channels adjacent opposite ends of said first surface; and vibration dampening material on said carrier, said vibration dampening material substantially lining said channels and said aperture and extending over at least a portion of said second surface.

In one embodiment, the vibration dampening material substantially lining the channels is isolated from the vibration dampening material substantially lining the aperture and extending over at least a portion of the second surface. The vibration dampening material substantially lining the aperture and extending over at least a portion of the second surface also extends over a portion of the first surface.

On the second surface, the vibration dampening material is configured to define a series of spaced ribs. The ribs are parallel and are generally equally spaced. On the first surface, the vibration dampening material is configured to define a disc. A washer is disposed on the disc. The vibration dampening material substantially lines the aperture of the washer and terminates at a flange overlying a portion of the washer to retain the washer to the disc.

In one embodiment, the ends of the carrier are folded back over the first surface of the carrier to define the channels and are sized to receive flanges of a furring channel.

According to another aspect there is provided an energy transmission control mount assembly to reduce transmission of energy between a first building structure and a second building structure, comprising:

a channel-like member adapted to be secured to the first building structure;

a carrier receiving and retaining said channel-like member, said carrier being adapted to be structurally secured to said second building structure; and vibration dampening material acting between at least one of said channel-like member and carrier, and said carrier and second building structure.

In one embodiment, the vibration dampening material acts between both the channel and carrier and the carrier and second building structure. The vibration dampening material is permanently bonded to the carrier. An aperture is provided in the carrier through which a fastener passes to secure the carrier to the second building structure. Vibration dampening material substantially lines the aperture to isolate the fastener and the carrier.

According to yet another aspect there is provided an energy transmission control mount to act between a pair of components comprising:

a carrier having a first major surface and an opposite second major surface and an aperture provided therein;

vibration dampening material on said carrier, said vibration dampening material substantially lining said aperture and extending over at least a portion of said second surface, the vibration dampening material extending over said second surface being configured to bear against one of said components; and retaining structure on the first surface of said carrier adapted to retain a second of said components.

The energy transmission control mount is effective, easy to install and inexpensive to manufacture. Its one-piece construction makes the energy transmission control mount simple to use.

BRIEF DESCRIPTION OF THE DRAWINGS

Embodiments will now be described more fully with reference to the accompanying drawings in which.

DETAILED DESCRIPTION OF THE EMBODIMENTS

Figure 1:
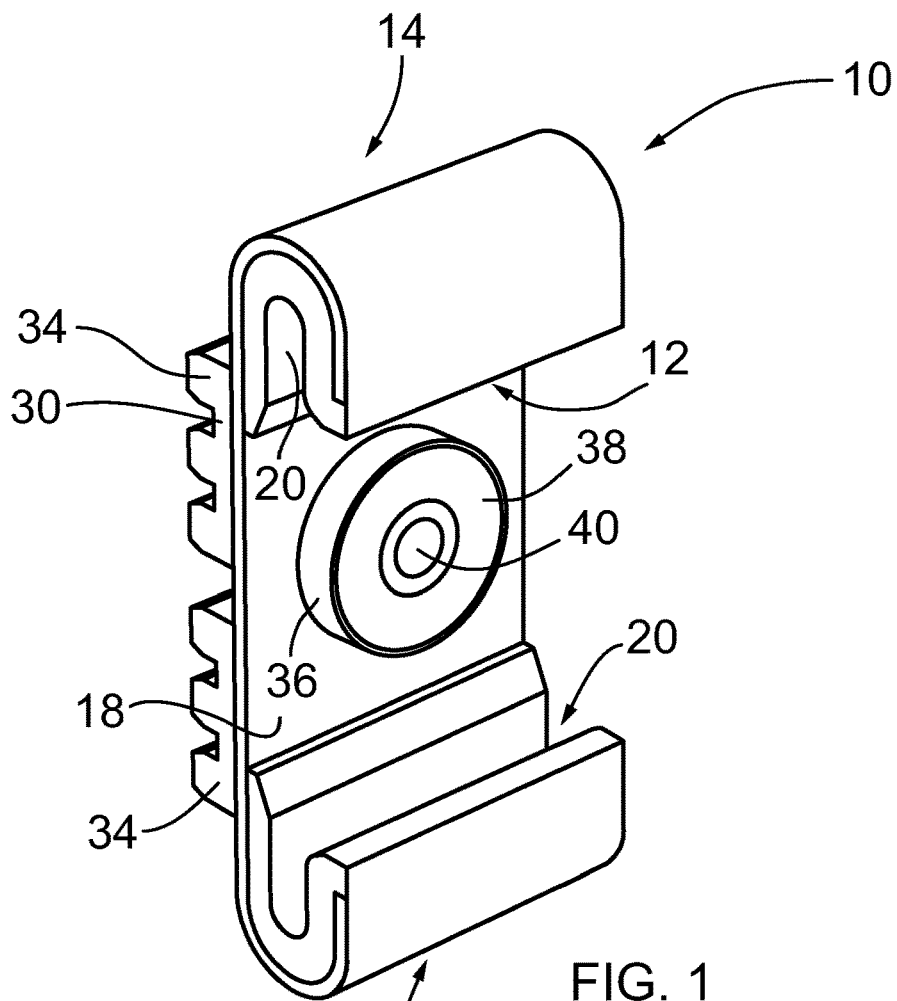
FIG. 1 is a perspective view of an energy transmission control mount.
Figure 2:
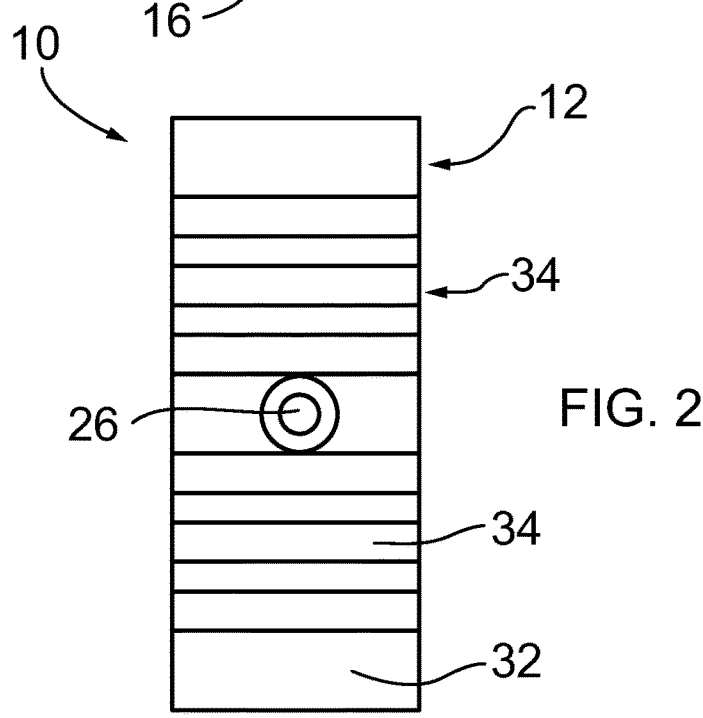
FIG. 2 is a rear elevational view of the energy transmission control mount of FIG. 1.

Turning now to FIGS. 1 and 2, an energy transmission control mount for isolating components such as for example, building structures is shown and is generally identified by reference numeral 10. In this particular example, energy transmission control mount 10 acts between a wall stud and a wall structure such as for example drywall, plaster board, gypsum or the like to reduce the transmission of energy between the wall stud and the wall structure. As can be seen, the energy transmission control mount 10 comprises a generally rectangular carrier 12 formed of metal such as for example steel. The top and bottom ends 14 and 16 of the carrier 12 are folded back over the front surface 18 of the carrier 12 to define channels 20. Vibration dampening material 22 substantially lines each of the channels 20. A central aperture 26 is also provided through the carrier 12. Vibration dampening material 30 substantially lines the aperture 26 and extends over a portion of both the front surface 18 and the back surface 32 of the carrier 12. The vibration dampening material 22 and 30 may be for example polyurethane bonded recycled rubber, polyether urethane foam or other suitable energy absorbing material.

On the back surface 32, the vibration dampening material 30 is configured to define a plurality of vertically and generally equally spaced, horizontal ribs 34. On the front surface 18, the vibration dampening material 30 is configured to define a disc 36 on which a washer 38 is disposed. The vibration dampening material 30 substantially lines the aperture of the washer 38 and forms an annular flange 40 over the washer 38 to retain the washer on the disc 36. The vibration dampening material 22 substantially lining the channels 20 is isolated from the vibration dampening material 30 substantially lining the aperture 26 and extending over the front surface 18 of the carrier 12. The vibration dampening material 22 and 30 is permanently bonded to the carrier 12

Figure 3:
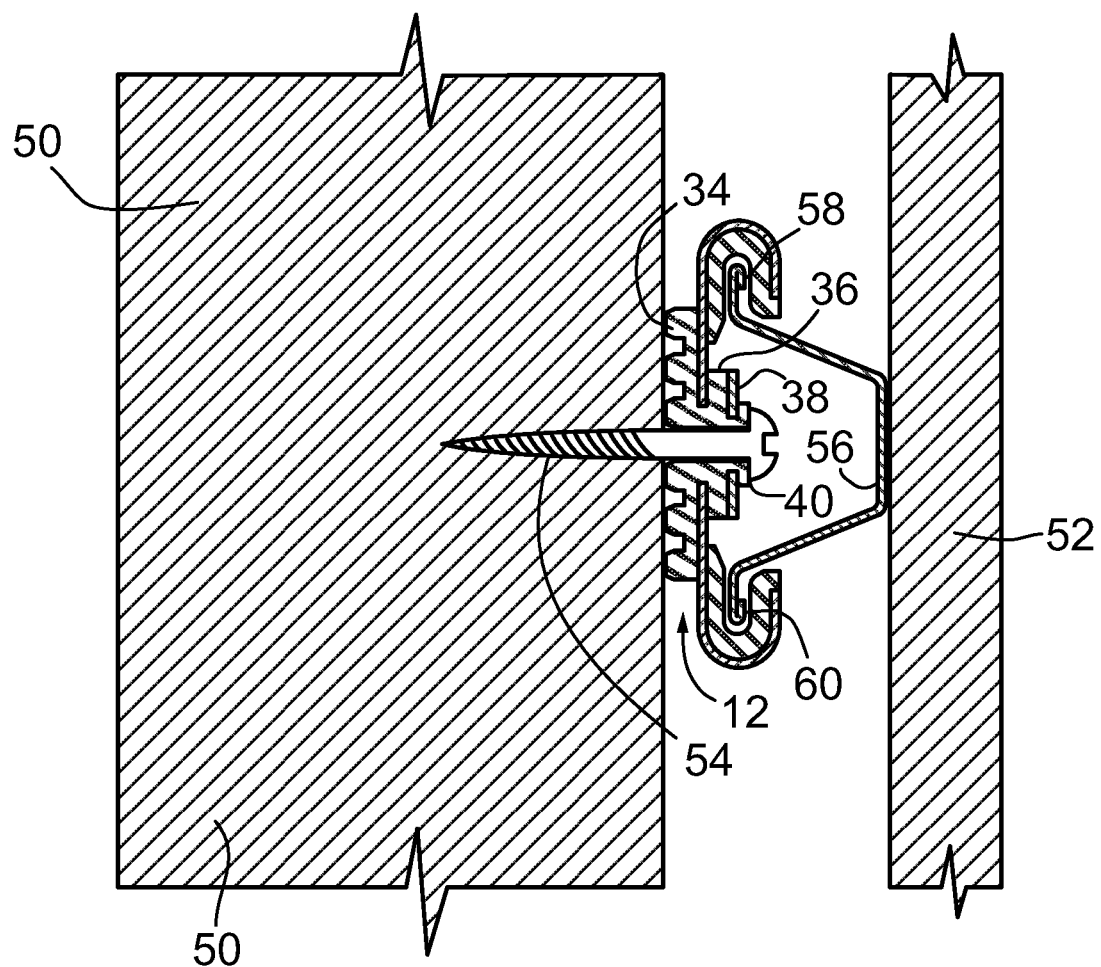
FIG. 3 is a side cross-sectional view of the energy transmission control mount interposed between a wall stud and drywall and secured to the wall stud via a fastener.

Turning now to FIG. 3, the energy transmission control mount 10 is shown in use interposed between a wall stud 50 and drywall 52. Energy transmission control mount 10 is designed to increase the sound transmission loss characteristics of the wall stud and drywall assembly. During installation of the energy transmission control mount 10, a fastener 54 is passed through the aligned apertures of the washer 38 and carrier 12 and engages the wall stud 50 to secure the energy transmission control mount 10 to the wall stud 50. The head of the fastener 54 rests on the flange 40 to isolate the head of the fastener 54 from the washer 38. In this position, the ribs 34 bear directly against the wall stud 50. A standard furring channel 56, typically formed of steel, is snapped into the front of the carrier 12 by inserting its upper and lower flanges 58 and 60, respectively, into the lined channels 20 thereby to retain the furring channel. Drywall fasteners (not shown) pass through the drywall 52 and engage the furring channel 56 to secure the drywall 52 to the furring channel 56. In this manner, the energy transmission control mount 10 acts between the drywall 52 and the wall stud 52 to reduce energy from being transmitted therebetween.

If energy such as vibration or sound is transmitted to the wall stud 50, the ribs 34 resist transmission of that energy to the carrier 12. The vibration dampening material 30 substantially lining the apertures of the carrier 12 and the washer 38 resists transmission of energy to the fastener 54. Energy that is transmitted to the carrier 12 moves to the extremities of the carrier. The vibration dampening material 22 lining the channels 20 resists transmission of this energy to the furring channel 56. In this manner, the energy transmission control mount 10 reduces the transfer of energy between the wall stud 50 and the furring channel 56 and hence the drywall 52.

In the example described above, the energy transmission control mount is shown interposed between a wall stud 50 and drywall 52. Those of skill in the art will however appreciate that the energy transmission control mount may be used to isolate other building structures such as for example floors and joists, masonry and wall studs, exterior walls and wall studs etc.

Although the energy transmission control mount is particularly suited to isolate building structures, the energy transmission control mount may be used in other environments to isolate components to inhibit vibration/sound from propagating between components. For example, the energy transmission control mount may be used in automobiles as an engine mount, or as a mount for vehicle body parts.

Although embodiments have been described, those of skill in the art will appreciate that variations and modifications may be made without departing from the spirit and scope thereof as defined by the appended claims.

What is claimed is:

1. An energy transmission control mount comprising:
   a carrier having a first major surface, an opposite second major surface and an aperture provided therein;
   channels adjacent opposite ends of said first surface;
   vibration dampening material on said carrier, said vibration dampening material extending over at least a portion of said first and second major surfaces and substantially lining said aperture; and
   a washer retained by the vibration dampening material extending over at least the portion of the first major surface in general alignment with said aperture.

2. An energy transmission control mount according to claim 1 wherein vibration dampening material also substantially lines said channels and wherein the vibration dampening material that substantially lines said channels is isolated from the vibration dampening material substantially lining said aperture and extending over at least the portion of said first and second major surfaces.

3. An energy transmission control mount according to claim 1 wherein the vibration dampening material extending over at least the portion of the second major surface is patterned.

4. An energy transmission control mount according to claim 3 wherein the patterned vibration dampening material is configured to define spaced ribs.

5. An energy transmission control mount according to claim 3 wherein the vibration dampening material extending over at least the portion of the first major surface is configured to define an annular flange that overlies at least a portion of the washer.

6. An energy transmission control mount according to claim 5 wherein the vibration dampening material extending over at least the portion of said first and second major surfaces and substantially lining said aperture is of unitary construction.

7. An energy transmission control mount according to claim 3 wherein said vibration dampening material is permanently bonded to said carrier.

8. An energy transmission control mount according to claim 3 wherein the vibration dampening material is formed of rubber.

9. An energy transmission control mount according to claim 8 wherein the vibration dampening material is formed of recycled rubber.

10. An energy transmission control mount according to claim 8 wherein the carrier is formed of metal.

11. An energy transmission control mount according to claim 10 wherein opposite ends of the carrier are folded back over the first surface to define the channels.

12. An energy transmission control mount according to claim 11 wherein said channels are sized to receive flanges of a furring channel.

13. An energy transmission control mount according to claim 1 wherein opposite ends of said carrier are folded back over said first surface to define said channels.

14. An energy transmission control mount according to claim 13 wherein said channels are sized to receive flanges of a furring channel.

15. An energy transmission control mount according to claim 1 wherein said vibration dampening material is permanently bonded to said carrier.

16. An energy transmission control mount according to claim 1 wherein the vibration dampening material is formed of rubber.

17. An energy transmission control mount according to claim 16 wherein the vibration dampening material is formed of recycled rubber.

18. An energy transmission control mount according to claim 16 wherein the carrier is formed of metal.

19. An energy transmission control mount according to claim 18 wherein opposite ends of the carrier comprises are folded back over the first surface to define the channels.

20. An energy transmission control mount according to claim 19 wherein said channels are sized to receive flanges of a furring channel.

21. An energy transmission control mount according to claim 1 wherein the vibration dampening material extending over at least the portion of said first and second major surfaces and substantially lining said aperture is of unitary construction.

* * * * *